United States Patent [19]

Nirschl

[11] Patent Number: 4,726,015
[45] Date of Patent: Feb. 16, 1988

[54] DIGITAL SIGNAL CHANNEL DISTRIBUTOR

[75] Inventor: Heinrich Nirschl, Munich, Fed. Rep. of Germany

[73] Assignee: Siemens Aktiengesellschaft, Munich, Fed. Rep. of Germany

[21] Appl. No.: 886,069

[22] Filed: Jul. 16, 1986

[30] Foreign Application Priority Data

Jul. 16, 1985 [DE] Fed. Rep. of Germany ....... 3525370

[51] Int. Cl.[4] .......................... H04Q 11/04; H04J 3/04
[52] U.S. Cl. ...................................... 370/58; 370/112; 328/104; 307/243
[58] Field of Search .................. 370/112, 100, 58, 84, 370/46; 328/104; 307/243

[56] References Cited

U.S. PATENT DOCUMENTS

| | | | |
|---|---|---|---|
| 3,940,566 | 2/1976 | Jeppsson et al. | 370/112 |
| 4,317,198 | 2/1982 | Johnson | 370/112 |
| 4,409,683 | 10/1983 | Woodward | 370/112 |
| 4,639,909 | 1/1987 | Nirschl et al. | 370/58 |

*Primary Examiner*—Jin F. Ng
*Assistant Examiner*—Frank M. Scutch, III
*Attorney, Agent, or Firm*—Hill, Van Santen, Steadman & Simpson

[57] ABSTRACT

A digital signal channel distributor is composed of two digital signal channel subdistributors of which one digital signal channel subdistributor assumes the transmission in one direction and the other assumes the transmission in the opposite direction, whereby a switching is possible within one direction. The digital signal channel subdistributors are connected to one another via an interface for clock adaptation or synchronization.

2 Claims, 5 Drawing Figures

DIGITAL SIGNAL CHANNEL DISTRIBUTOR

BACKGROUND OF THE INVENTION

1. Field of the Invention

The present invention relates to a digital signal channel distributor comprising small end gates each composed of an input and an output, comprising a first subdigital signal channel distributor having n/2 interfaces each composed of an input and an output whose inputs are connected to the inputs of the first half of the gates and whose outputs are connected to the outputs of the second half of the gates, and comprising a monitor which emits multiplex addresses, multiplex signalizing information and a multiplex clock, as well as comprising a second subdigital signal channel distributor having n/2 interfaces each composed of an input and of an output whose inputs are connected to the inputs of the second half of the gates and whose outputs are connected to the outputs of the first half of the gates, and comprising a monitor which emits multiplex addresses, multiplex signalization information and a multiplex clock.

2. Description of the Prior Art

The Siemens publication "Digitalsignal-Kanalverteiler DKVt2", Order No. S42023-A750-A1-1-29 discloses a digital signal channel distributor with which the 64 kbit/s channels of eight 2 Mbit/s signals passing its gates can be arbitrarily switched. For special operating instances, the maximum switching capacity can be doubled by interconnecting two digital signal channel distributors DKVt2 which are referred to below as subdigital signal channel distributors. Each of the two subdigital signal channel distributors DKVt2 then processes only one signal direction. Connecting lines between the two devices provide the coupling required between the two signal directions, for example, overlaying the signalization bits.

A digital signal channel distributor is also known from the European patent application No. 0 142 662 A1.

SUMMARY OF THE INVENTION

The object of the present invention is to provide a practical realization of the interconnection of two digital signal channel distributors in a simple manner.

Proceeding on the basis of a digital signal channel distributor of the type set forth above, this object is achieved, according to the present invention, in a first embodiment in that a clock matching controlled by its own multiplex address is provided for multiplex signalization information in each digital signal channel subdistributor, and in that connection for the multiplex addresses, multiplex signalization information and the multiplex clock are provided from the monitoring of the first digital signal channel subdistributor to the clock matching of the second digital channel subdistributor and from the monitoring of the second digital signal channel subdistributor to the clock matching of the first digital signal channel subdistributor.

Based on a digital signal channel distributor of the type set forth above, wherein, however, the multiplex addresses and the multiplex clocks need not be exchanged between the digital signal channel subdistributors, the object is achieved, according to the invention, in a second embodiment in that a synchronizing device is provided as a "master" in one of the two digital signal channel subdistributors, the synchronizing device providing its multiplex clock and a synchronizing (reset) signal to the clock supply of the other subdigital signal channel distributor. Connections for the multiplex signalization information are provided from the monitoring of the first digital signal channel subdistributor to a multiplex signalization information output of the second subdigital signal channel distributor and from the monitoring of the second digital signal channel subdistributor to a multiplex signalization information output of the first digital signal channel distributor.

The gates of the digital signal channel distributor and the interfaces of the digital signal channel subdistributors have the same significance. They have been differently referenced only in order to be more easily distinguishable.

When the digital signal channel subdistributors each have eight gates, then the digital signal channel distributor of the present invention contains sixteen gates. Switching cannot, however, be arbitrarily undertaken between these devices. On the contrary, one digital signal channel subdistributor undertakes the transmission in one direction, whereas the other digital signal channel subdistributor effects the transmission in the opposite direction. Switching can be arbitrarily undertaken between that half of the gates whose inputs are assigned to the one digital signal channel subdistributor and the other half of these gates. This is respectively not possible within a single half. However, there is a great need for such a digital signal channel distributor.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
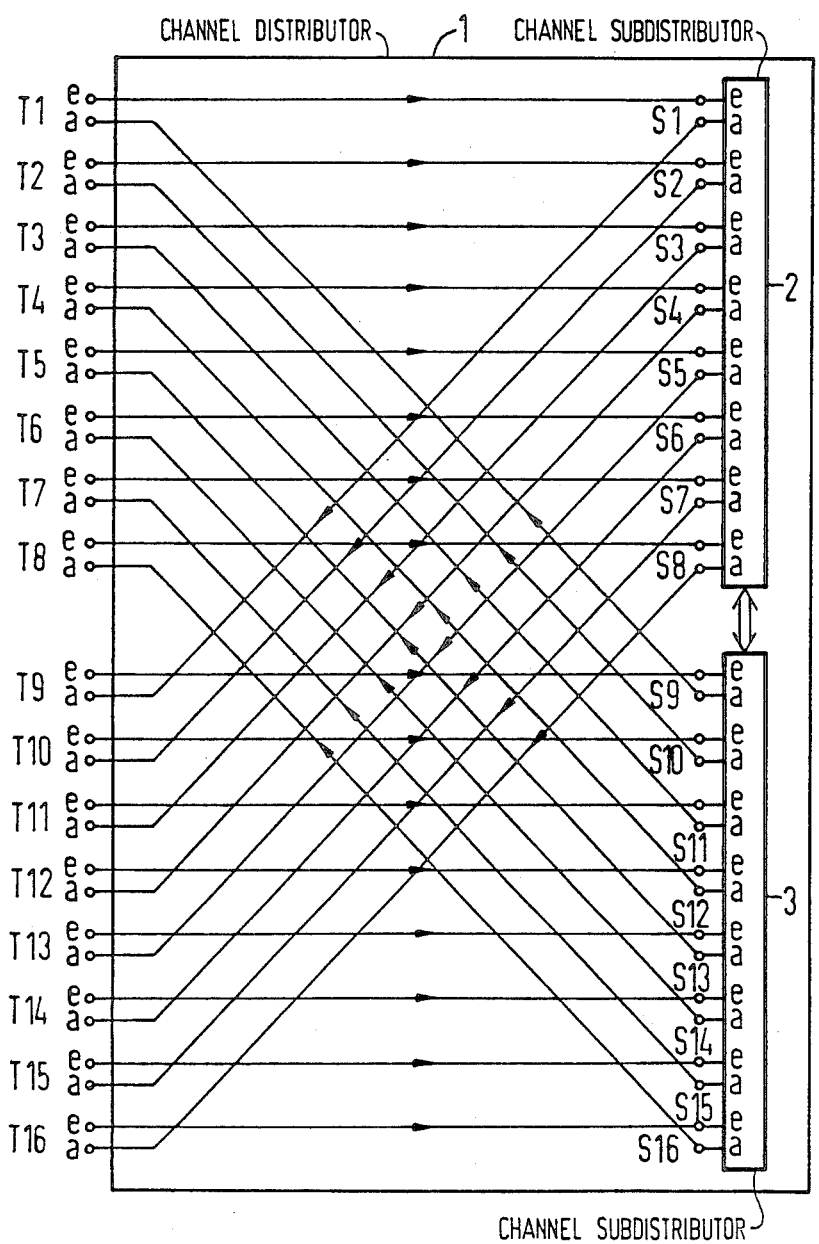
FIG. 1 is a schematic illustration of a digital signal channel distributor of the first embodiment and of the second embodiment merely in terms of the connections between its gates and the interfaces of the subdigital signal channel distributors.

FIG. 1 illustrates a digital signal channel distributor 1 having gates T1–T16 which each cmprise an input e1 and an output a1. It comprises a digital signal channel subdistributor 2 including interfaces S1–S8 of which each comprises an input e2 and an output a2, and a digital signal channel subdistributor 3 comprising interfaces S9–S16 to each of which an input e2 and an output a2 are likewise assigned. The interfaces S1–S16 are the gates of the digital signal channel subdistributors 2 and 3. Both these are interconnected in the manner illustrated in FIG. 2 or in FIG. 5.

The input e1 of the gates T1–T8 are connected to the input e2 of the interfaces S1–S8 and the output a1 of the gates T1–T8 are connected to the outputs a2 of the interfaces S9–S16. The input e1 of the gates T9–T16 are connected to the input e2 of the interfaces S9–S16 and the outputs a1 of the gates T9–T16 are connected to the outputs a2 of the interfaces S1–S8.

This interconnection shows that the digital signal channel subdistributor 2 can switch only in the direction from the gates T1–T8 to the gates T9–T16, whereas the digital signal channel subdistributor 3 takes over the opposite direction from the gates T9–T16 to the gates T1–T8.

Figure 2:
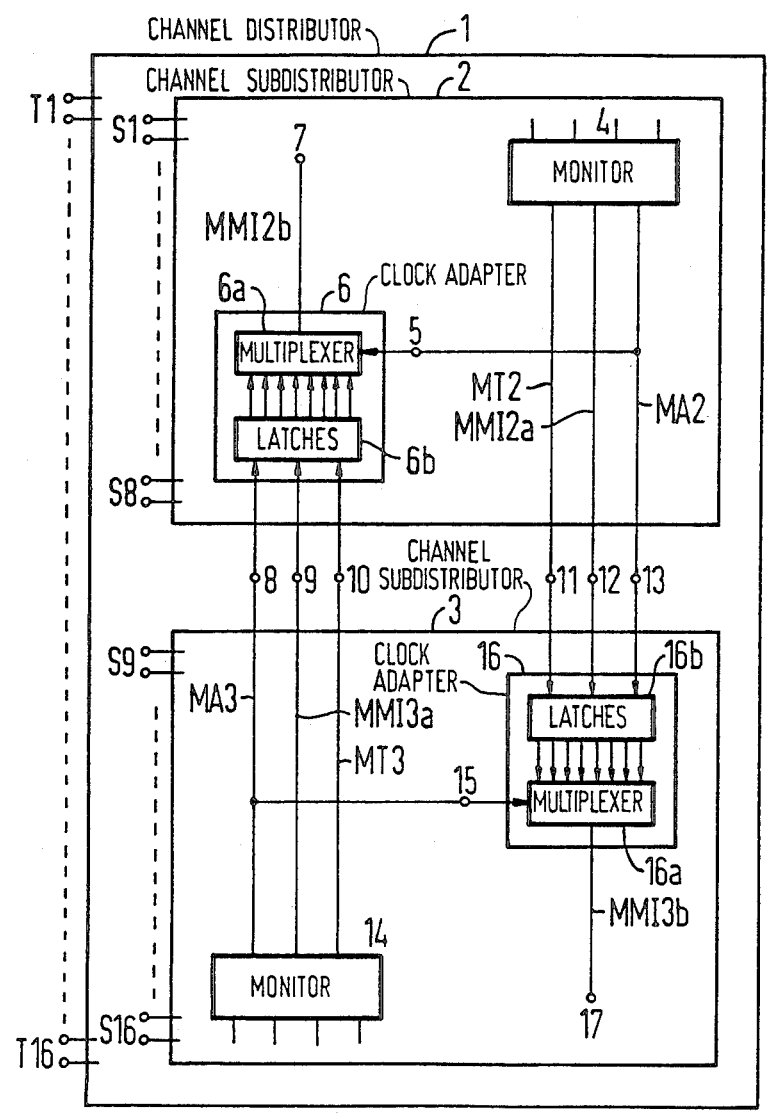
FIG. 2 is a schematic diagram illustrating circuit adaptations in the subdigital signal channel distributors of the first embodiment.

FIG. 2 illustrates the digital signal channel distributor 1 and the digital signal channel subdistributors 2 and 3 which are connected as shown in FIG. 1 and which comprise circuit matchings in accordance with the first embodiment of the invention.

In a known manner, the digital signal channel subdistributors 2 and 3 include monitors 4 and 14, respectively, in which the multiplex address MA2 or, respectively, MA3, the multiplex signalization information MMI2a or, respectively, MMI3a, and the multiplex clocks MT2 or, respectively, MT3 are available, and also contain clock adapters 6 and 16 to which the multiplex addresses MA2 and MA3 are supplied via the terminals 5 and 15. The clock adapters 6 and 16 each contain an eight-to-one multiplexer 6a and 16a (each an integrated circuit 74 HC 251) and each contain eight addressable RS flip-flops (addressable 8-bit latches) 6b and 16b operating status-wise (each an integrated circuit 74 HC 259).

The multiplex addresses MA3 are supplied to the addressable 8-bit latch 6b in the clock adapter 6 via the terminal 8, the multiplex signalization information MMI3a are supplied thereto via the terminal 9, and the multiplex clock MT3 is supplied thereto via a terminal 10. The eight-to-one multiplexer 6a groups the output signals of the eight-bit latch 6b, controlled by the multiplex addresses MA2 at the terminal 5, and emits them to the terminal 7 as multiplex signalization information MMI2b.

The multiplex clock MT2 is fed to the addressable 8-bit latch 16b in the clock adapter 16 via a terminal 11, the multiplex signalization information MMI2a, is applied thereto via a terminal 12, and the multiplex addresses MA2 are applied thereto via a terminal 13. The eight-to-one multiplexer 16a groups the output signals of the eight-bit latch 16b, controlled by the multiplex addressses MA3 at the terminal 15, and therefore emits them to the terminal 17 as multiplex signalization information MMI3b.

Figure 3:
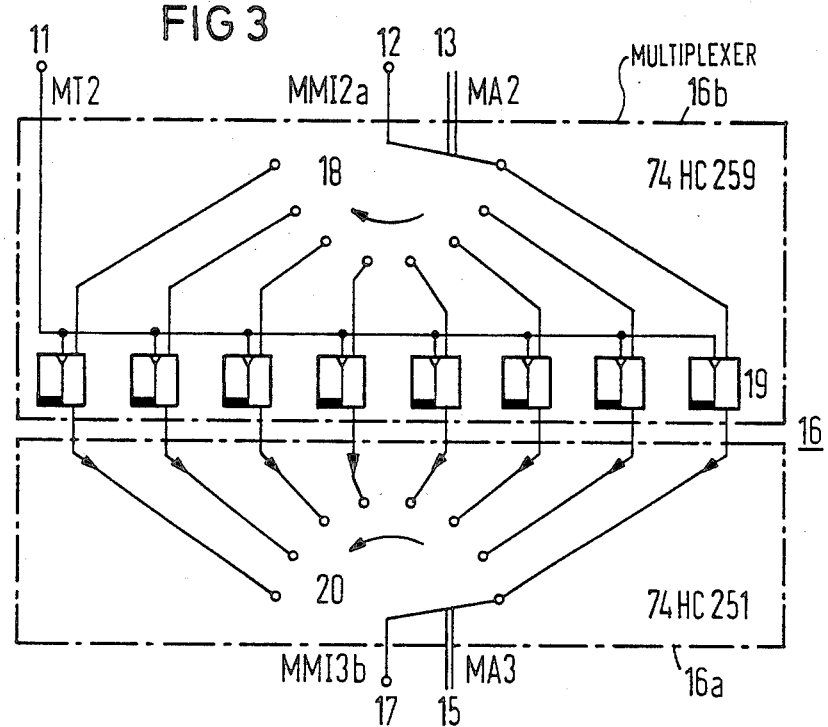
FIG. 3 is a schematic diagram illustrating clock matching for the first embodiment of the invention.

FIG. 3 shows a basic circuit diagram of the clock adapter 16 which is realized with the integrated circuits 74 HC 251 (16a) and 74 HC 259 (16b). The integrated circuit 74 HC 259 can be illustrated in the operating mode used here by a demultiplexer 18 and eight D flip-flops of which that arranged at the extreme right is referenced 19 and the integrated circuit 74 HC 251 contains a multiplexer 20.

Figure 4:
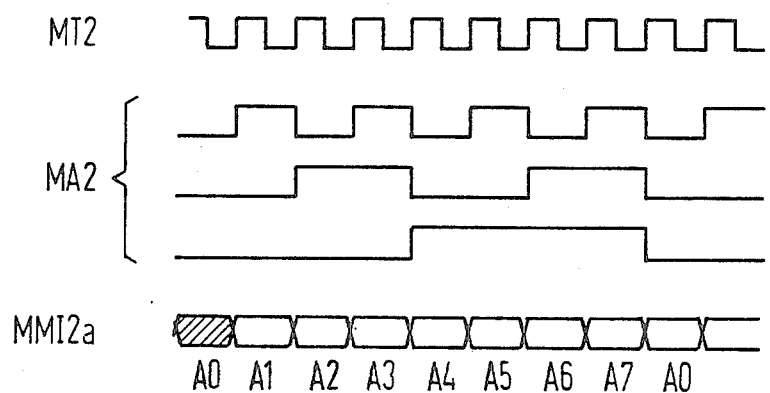
FIG. 4 is a graphic illustration of a pulse plan relating to the first embodiment of the invention.

FIG. 4 shows the multiplex clock MT2 and the multiplex addresses MA2 whose three pulses form a three-place code word in one period of the multiplex clock MT2, these being addresses A0–A7 for the gates. This being indicated by shading in FIG. 4, the multiplex signalization information MMI2a transmits information in FIG. 3 for the first gate T1 via the multiplexer 18, the activated D flip-flop 19 and the demultiplexer 20. The multiplex signalization information MMI2a is therefore resolved in the demultiplexer 18 and, controlled by the multiplex addresses MA3, is combined in the multiplexer 20 as multiplex signalization information MMI3b, and now combined in the clock of the digital signal channel subdistributor 3.

Multiplex signalization information MMI2a contain, for example, urgent and non-urgent alarms or alarms of the signalling multiframe which must be returned to the devices connected to the gates T1–T8. They are therefore supplied to the digital signal channel subdistributor 3 via the terminal 17, the digital signal channel subdistributor 3 emitting the answerbacks via the outputs a1 of the gates T1–T8. The multiplexer adapter 16 effects that, given simultaneous delivery of the multiplex clock MT2 and of the multiplex addresses MA2 which enable the assignment of the signalization information to the individual gates T1–T8, the multiplex signalization information MMI2a are adapted to the multiplex addresses MA3 of the digital signal channel subdistributor 3. The multiplex signalization information MMI3a of the opposite direction are correspondingly treated.

Figure 5:
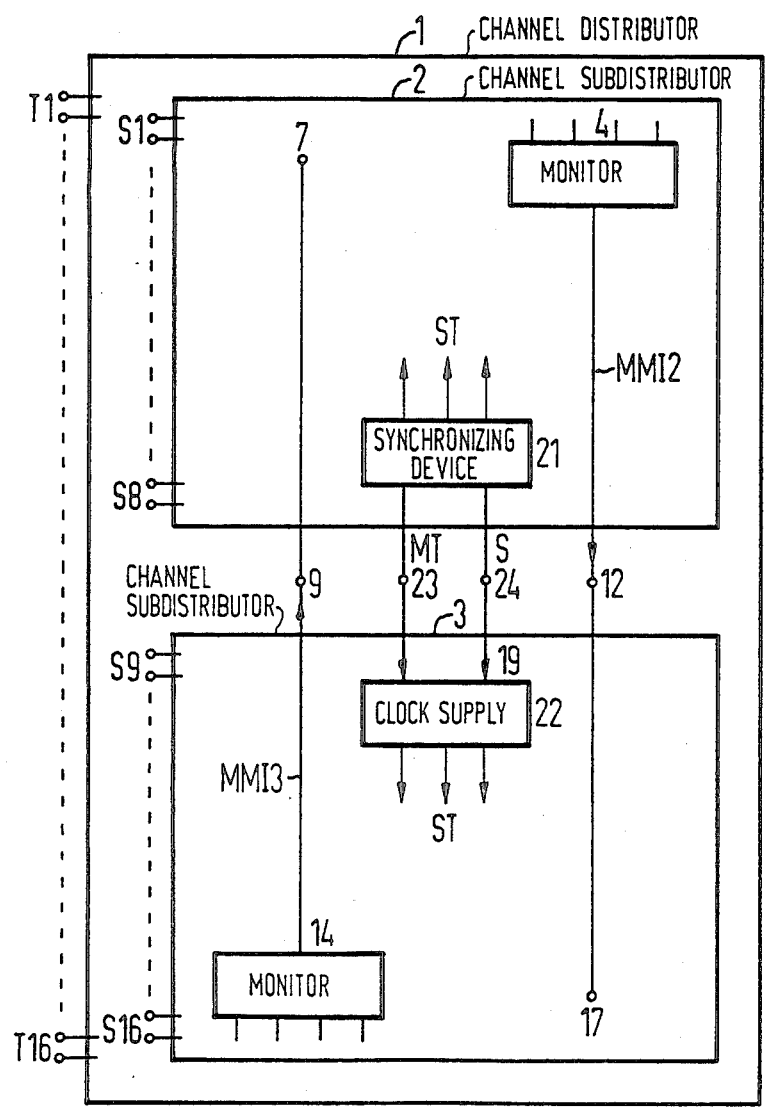
FIG. 5 is a schematic diagram of the circuit adaptations in the subdigital signal channel distributors for the second embodiment of the invention.

FIG. 5 illustrates the digital signal channel distributor 1 and the digital signal channel subdistributors 2 and 3 as in FIG. 1 with circuit adaptations in accordance with the second embodiment of the invention. In comparison to the first embodiment of FIG. 2, the clock adapters 6 and 16, as well as the connections 5, 8, 10, 11, 13 and 15 are eliminated. Instead, the digital signal channel subdistributor 2 contains a synchronizing device 21 as a "master", the synchronizing device 21 emitting a multiplex clock MT and a synchronizing or reset pulse S to the clock supply 22 of the digital signal channel subdistributor 3 operating as a "slave". The synchronizing or reset pulse S is applied to the clearing input of a clock divider chain (binary counter). A synchronization is also possible and standard via set ("preset") inputs.

Given this arrangement, also, the multiplex signalization information MMI2 and MMI3 must be communicated to the respective other subdigital signal channel distributor 2 or, respectively, 3. However, a clock adaptation is superfluous because the subdigital signal channel distributor 3 does not work with its own multiplex clock and its multiplex addresses are formed synchronously with those of the digital signal channel subdistributor 2 by way of the reset pulse S.

By way of control clocks ST such as, for example, the multiplex addresses MA2 and MA3, the multiplex clock MT controls all device functions in the digital signal channel subdistributors 2 and 3. In order for all control clocks ST to be synchronized, the clock supply 22 of the slave device 3 is synchronized from the master device 2, for example on the basis of the periodic reset pulses S. As a result thereof, the multiplex signalization information MMI2 and MMI3 are synchronized with one another and do not require any clock adaptation.

I claim:
1. A digital channel distributor comprising:
  a plurality n of gates each including an input and an output and arranged in first and second groups;
  a first digital signal channel subdistributor including n/2 interfaces each including an input connected to a respective input of said gates of said first group, an output connected to a respective output of said gates of said second group, and a first monitor operable to emit first multiplex addresses and first multiplex signalization information and a first multiplex clock;
  a second digital signal channel subdistributor including n/2 interfaces each including an input connected to a respective input of said gates of said second group, an output connected to a respective output of said gates of said first group, a second monitor operable to emit second multiplex addresses and second signalization information and a second multiplex clock;

each of said digital channel signal subdistributors comprising a clock adapter connected to the respective monitor and operated by the respective multiplex addresses to adapt the first multiplex clock to the second multiplex clock and vice versa.

2. A digital channel distributor comprising:

a plurality n of gates each including an input and an output and arranged in first and second groups;

a first digital signal channel subdistributor including n/2 interfaces each including an input connected to a respective input of said gates of said first group, an output connected to a respective output of said gates of said second group, a monitor operable to emit multiplex signalization information and a multiplex signalization information output;

a second digital signal channel subdistributor including n/2 interfaces each including an input connected to a respective input of said gates of said second group, and an output connected to a respective output of said gates of said first group, a monitor operable to emit multiplex signalization information and a multiplex signalization information output;

said first digital signal channel subdistributor further comprising a synchronizing device operable to provide a multiplex clock and connected to provide a synchronizing signal to said second digital signal channel subdistributor; and connections extending from each of said monitors to the multiplex signalization output of the other digital signal channel subdistributor.

* * * * *